United States Patent [19]

Yoshitake et al.

[11] Patent Number: 4,683,319

[45] Date of Patent: Jul. 28, 1987

[54] THERMAL STABILIZER FOR ORGANOPOLYSILOXANE OILS

[75] Inventors: Makoto Yoshitake; Keiichi Kishimoto, both of Tokyo, Japan

[73] Assignee: Toray Silicone Co., Ltd., Tokyo, Japan

[21] Appl. No.: 917,328

[22] Filed: Oct. 9, 1986

[30] Foreign Application Priority Data

Nov. 7, 1985 [JP] Japan ................... 60-249743

[51] Int. Cl.$^4$ .................................. C07F 7/10
[52] U.S. Cl. ..................... 556/425; 556/401
[58] Field of Search .................. 556/401, 425

[56] References Cited

U.S. PATENT DOCUMENTS

| | | | |
|---|---|---|---|
| Re. 28,938 | 8/1976 | Koda et al. | 556/401 |
| 2,389,803 | 11/1945 | McGregor et al. | 556/401 |
| 2,389,804 | 11/1945 | McGregor et al. | 556/401 |
| 2,517,536 | 8/1950 | Chenicek | 556/401 |
| 2,697,114 | 12/1954 | Chenicek | 556/401 |
| 4,612,055 | 9/1986 | Manis et al. | 556/401 X |

FOREIGN PATENT DOCUMENTS 55-18457  5/1980  Japan .

*Primary Examiner*—Paul F. Shaver
*Attorney, Agent, or Firm*—Alexander Weitz

[57] ABSTRACT

A thermal stabilizer for organopolysiloxane oils is disclosed. The stabilizer is formed by the reaction of (A) an organopolysiloxane with (B) an aromatic aminophenol in the presence of (C) a quaternary phosphonium hydroxide, or in the presence of both the quaternary phosphonium hydroxide comprising component (C) and (D) an organopolysiloxane cyclic. Organopolysiloxane oils containing said thermal stabilizer are not subject to viscosity increases or gelation in long-term heating at high temperatures. Furthermore, such combinations show very little viscosity decline in long-term heating at high temperatures.

14 Claims, No Drawings

THERMAL STABILIZER FOR ORGANOPOLYSILOXANE OILS

BACKGROUND OF THE INVENTION

The present invention relates to a thermal stabilizer for organopolysiloxane oils. Prior thermal stabilizers for organopolysiloxane oils, which are employed in order to prevent gelation or viscosity increases in the organopolysiloxane oil, have been obtained by a dehydrochlorination reaction in which p-hydroxydiphenylamine is brought into contact with dimethyldichlorosilane or the chlorineterminated dimethylpolysiloxane obtained from dimethyldichlorosilane (refer to Japanese Pat. No. 55-18457[18457/80]).

However, when such a thermal stabilizer is added to an organopolysiloxane oil, the problem rises that the viscosity of said organopolysiloxane oil is reduced when it is subjected to long-term heating at high temperatures.

SUMMARY OF THE INVENTION

The present invention eliminates the above-mentioned problem and has the goal of providing a thermal stabilizer for organopolysiloxane oils which will largely prevent any decline in the viscosity of the organopolysiloxane oil in long-term heating at high temperatures.

This goal is achieved by a thermal stabilizer composition for organopolysiloxane oils, comprising the reaction product of: (A) an organopolysiloxane having the average unit formula $$R_a SiO_{(4-a)/2}$$

wherein R is a monovalent hydrocarbon group and a is 1.4 to 2.3 with (B) from 0.01 to 10 parts by weight of an aromatic aminophenol per 100 parts of said organopolysiloxane (A), in the presence of (C) from 0.001 to 1.0 part by weight of a quaternary phosphonium hydroxide per 100 parts of said organopolysiloxane (A).

Alternatively, this achieved by a thermal stabilizer composition for organopolysiloxane oils, comprising the reaction product of: (A) an organopolysiloxane having the average unit formula $$R_a SiO_{(4-a)/2}$$

wherein R is a monovalent hydrocarbon group and a is 1.4 to 2.3 with (B) from 0.01 to 10 parts by weight of an aromatic aminophenol per 100 parts of said organopolysiloxane (A), in the presence of (C) from 0.001 to 1.0 parts by weight of a quaternary phosphonium hydroxide per 100 parts of said organopolysiloxane (A) and in the presence of (D) from 0 to 20 parts by weight of an organopolysiloxane cyclic having the general formula $$[(R_2SiO)_n]$$

per 100 parts of said organopolysiloxane (A), wherein R is a monovalent hydrocarbon group and n in an integer having a value of 3 to 6.

DETAILED DESCRIPTION OF THE INVENTION

This invention relates to a reaction product of (A) an organopolysiloxane with (B) an aromatic aminophenol in the presence of (C) a quaternary phosmomium hydroxide and, optionally, also in the presence of (D) an organopolysiloxane cyclic.

By way of explanation, the organopolysiloxane comprising component (A) is one starting material for this invention's thermal stabilizer for organopolysiloxane oils. Component (A) may be represented by the average formula $$R_a SiO_{(4-a)/2}$$

wherein a is 1.4 to 2.3. In this formula, R is a monovalent hydrocarbon group and it is exemplified by alkyl groups such as methyl, ethyl, propyl and butyl; substituted alkyl groups such as 2-phenylethyl, 2-phenylpropyl and 3,3,3-trifluoropropyl; alkenyl groups such as vinyl and propenyl; and aryl and substituted aryl groups such as phenyl, tolyl and xylyl. Alkyl and aryl groups are preferred and methyl and phenyl are particularly preferred. Also, this component may contain a small quantity of silicon-bonded hydrogen atoms, silicon-bonded hydroxyl groups or silicon-bonded alkoxy groups.

The structure of this component may be straight chain, branched chain, cyclic or network. Straight chain or branched chain is preferred. The terminal group is preferably terminated by an organosiloxy group such as trialkylsiloxy or alkenyldialkylsiloxy, or by an alkoxy group or hydroxyl group.

This component is to contain at least 10 siloxane units, but preferably contains 100 to 5,000, and more preferably 200 to 1,000, from the standpoint of the effect in preventing a decline in viscosity.

Concrete examples of this component are trimethylsiloxy group-terminated dimethylpolysiloxanes, dimethylvinylsiloxy group-terminated dimethylpolysiloxanes, trimethylsiloxy group-terminated dimethylsiloxane-methylvinylsiloxane copolymers, trimethylsiloxy group-terminated bicopolymers, trimethylsiloxy group-terminated methylphenylpolysiloxanes, hydroxyl group-terminated dimethylpolysiloxanes, hydroxyl group-terminated dimethlsiloxane-methylphenylsiloxane copolymers and copolymers composed of trimethylsiloxane units and $SiO_2$ units. Also usable is 1 species or 2 or more species of this component with different numbers of siloxane units and/or different structures.

The aromatic aminophenol comprising the componet (B) used in the present invention is used as a starting material in combination with component (A). Concrete examples of this component are

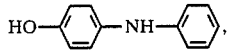,

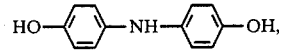

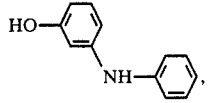,

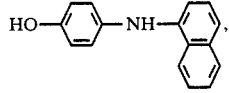,

-continued

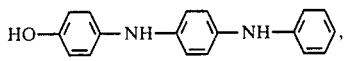

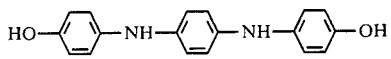

The quaternary phosphonium hydroxide comprising component (C) is a reaction catalyst for components (A) and (B). Component (C) may be represented by the formula $R^1_4POH.$ In this formula, $R^1$ is independently selected from alkyl or aryl groups and it is exemplified by methyl, ethyl, propyl, butyl, octyl and phenyl. Quaternary phosphonium hydroxides having mixed $R^1$ groups, such as methyltriphenyl phosphonium hydroxide, are also suitable herein.

The organopolysiloxane cyclic comprising component (D) functions to promote the reaction of component (A) with component (B) and so shorten the reaction time. Component (D) may be represented by the formula

wherein n is an integer having a value of 3 to 6. In this formula, R is a monovalent hydrocarbon group and it is exemplified as for component (A), alkyl groups being preferred.

The present invention's thermal stabilizer for organopolysiloxane oils is produced by the reaction of the organopolysiloxane comprising component (A) with the aromatic aminophenol comprising component (B) in the presence of the quaternary phosphonium hydroxide comprising component (C), or in the presence of both the quaternary phosphonium hydroxide comprising component (C) and the organopolysiloxane cyclic comprising component (D).

The use ratio of starting components (A) and (B) is preferably in the range of 0.01 to 10 parts by weight component (B) per 100 parts by weight component (A), and more preferably in the range of 0.1 to 5 parts by weight component (B) per 100 parts by weight component (A) in order to reduce unreacted components (A) and/or (B).

The use ratio of component (C) is preferably in the range of 0.001 to 1.0 part by weight component (C) per 100 parts by weight component (A), and more preferably in the range of 0.01 to 0.1 part by weight component (C) per 100 parts by weight component (A).

Component (D) is preferably used at 0 to 20 parts by weight, and more preferably 0 to 15 parts by weight, per 100 parts by weight component (A).

The reaction temperature is preferably 130 to 280° C. The reaction atmosphere is an inert gas atmosphere or the ambient.

A characteristic of this reaction is that the viscosity of the reaction mixture gradually declines during the reaction and then reaches a nearly constant value. The reaction is taken to be complete at this point.

Furthermore, in the event of the use of the organopolysiloxane cyclic comprising component (D), the cyclic component should be stripped off at elevated temperatures under reduced pressures after the reaction. When unreacted components (A) and/or (B) remain in the reaction product, they are removed after the reaction by means such as filtration to obtain a homogeneous thermal stabilizer.

The thermal stabilizer of the present invention finds application in various organopolysiloxane oils, which are exemplified by the organopolysiloxanes given as examples for component (A).

The use quantity of the present invention's thermal stabilizer for organopolysiloxane oils is not particularly restricted.

EXAMPLES

The present invention will be explained in detail in the following using examples of execution. In the examples, "part" denotes "part by weight" and the viscosity is the value measured at 25° C.

EXAMPLES 1

To 100 parts of trimethylsiloxy group-terminated dimethylpolysiloxane with a viscosity of 500 cS are added 0.5 part N-phenylaminophenol and 0.03 part tetrabutylphosphonium hydroxide, followed by mixing at room temperature to obtain a homogeneous dispersion. This mixture is reacted at a temperature of 200° C. under a nitrogen gas atmosphere. The viscosity assumes a nearly constant value 2 hours after the start of the reaction, followed by cooling to room temperature, the addition of diatomaceous earth and then purification by filtration. The obtained reaction product is a light-yellow, transparent liquid with a viscosity of 220 cS.

Five parts of this reaction product is added to 100 parts trimethylsiloxy group-terminated dimethylpolysiloxane with a viscosity of 1,000 cS and this is mixed at room temperature to homogeneity to obtain an organopolysiloxane oil with a viscosity of 920 cS.

Thirty grams of this organopolysiloxane oil is weighed into a 100 cc beaker and then maintained in a hot air-circulation oven at 250° C. in order to measure the viscosity change.

The results are reported in Table 1.

COMPARISON EXAMPLE 1

As a blank, 30 g of the trimethylsiloxy groupterminated dimathylpolysiloxane with a viscosity of 1,000 cS is weighed into a 100 cc beaker and then maintained in the hot air-circulation oven at 250° C. in order to measure the viscosity change.

The results are reported in Table 1.

COMPARISON EXAMPLE 2

To 100 parts of the trimethylsiloxy group-terminated dimethylpolysiloxane with a viscosity of 1,000 cS is added 0.5 parts organopolysiloxane with the formula

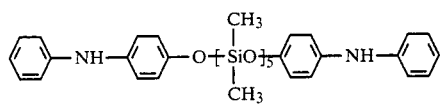

and this is then mixed at room temperature to homogeneity.

Thirty grams of this organopolysiloxane oil is weighed into a 100 cc beaker and then maintained in a hot air-circulation oven at 250° C. in order to measure the viscosity change.

EXAMPLE 2

Twenty parts of the reaction product of Example 1 is added to 100 parts of trimethylsiloxy group-terminated dimethylpolysiloxane with a viscosity of 350 cS and this is mixed at room temperature to homogeneity to obtain an organopolysiloxane oil with a viscosity of 325 cS. Thirty grams of this organopolysiloxane oil is weighed into a 100 cc beaker and then maintained in a hot air-circulation oven at 250° C. in order to measure the viscosity change.

The results are reported in Table 1.

EXAMPLE 3

Ten parts dimethylsiloxane cyclic tetramer is added to and mixed to homogeneity at room temperature with 100 parts of a trimethylsiloxy group-terminated dimethylpolysiloxane with a viscosity of 10,000 cS. After heating this to 200° C., 0.8 part N- phenylaminophenol and 0.05 part tetrabutylphosphonium hydroxide are added, followed by a reaction at the same temperature under a nitrogen gas atmosphere. The viscosity becomes nearly constant 20 minutes after the start of the reaction and the dimethylsiloxane cyclic tetramer is then stripped off in vacuo at 200° C./10 mmHg. The reaction product is cooled to room temperature, diatomaceous earth is added and purification is conducted by filtration. The obtained reaction product is a light-yellow, transparent liquid with a viscosity of 2,000 cS.

Five parts of this reaction product is added to 100 parts of a trimethylsiloxy group-terminated dimethylpolysiloxane with a viscosity of 2,000 cS and this is then mixed at room temperature to homogeneity to obtain an organopolysiloxane oil with a viscosity of 2,000 cS.

Thirty grams of this organopolysiloxane oil is weighed into a 100 cc beaker and then maintained in a hot air-circulation oven at a temperature of 250° C. in order to measure the viscosity change.

The results are reported in Table 1.

COMPARISON EXAMPLE 3

To 100 parts of the trimethylsiloxy group-terminated dimethylpolysiloxane with a viscosity of 2,000 cS is added 0.6 part organopolysiloxane with the formula

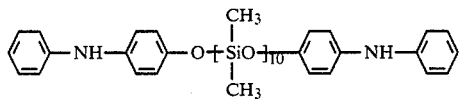

and this is then mixed at room temperature to homogeneity.

Thirty grams of this organopolysiloxane oil is weighed into a 100 cc beaker an then maintained in a hot air-circulation oven at a temperature of 250° C. in order to measure the viscosity change.

The results are reported in Table 1.

EXAMPLE 4

To 100 parts of a trimethylsiloxy group-terminated dimethylsiloxane-diphenylsiloxane copolymer with a viscosity of 10,000 cS (diphenylsiloxane units =10 mol%) are added 0.1 part N-naphthylaminophenol and 0.01 part methyltriphenylphosphonium hydroxide and this is then mixed at room temperature to obtain a homogeneous dispersion. This mixture is reacted in the ambient at 150° C. The viscosity is nearly constant 2 hours after the start of the reaction and the reaction mass is cooled to room temperature, combined with diatomaceous earth and then purified by filtration. The obtained reaction product is a light-yellow, transparent liquid with a viscosity of 8,300 cS.

Twenty parts of this reaction product is added to 100 parts of a trimethylsiloxy group-terminated dimethylsiloxane-diphenylsiloxane copolymer with a viscosity of 5,000 cS. (diphenylsiloxane units = 10 mol%), followed by mixing at room temperature to homogeneity to obtain an organopolysiloxane oil with a viscosity of 5,500 cS.

Thirty grams of this organopolysiloxane oil is weighed into a 100 cc beaker and then maintained in a hot air-circulation oven at a temperature of 250° C. in order to measure the viscosity change.

The results are reported in Table 1.

COMPARISON EXAMPLE 4

To 100 parts of the trimethylsiloxy group-terminated dimethylsiloxane-diphenylsiloxane copolymer with a viscosity of 5,000 cS (diphenylsiloxane units =10 mol%) is added 0.5 part of the organopolysiloxane with the formula

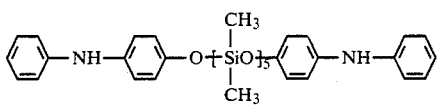

and this is then mixed at room temperature to homogeneity.

Thirty grams of this organopolysiloxane oil is weighed into a 100 cc beaker and then maintained in a hot air-circulation oven at a temperature of 250° C. in order to measure the viscosity change.

The results are reported in Table 1.

EXAMPLE 5

Five parts dimethylsiloxane cyclic tetramer is added to 100 parts of hydroxyl group-terminated dimethylpolysiloxane with a viscosity of 30,000 cS and this is then mixed at room temperature to homogeneity. After heating to 250° C., 1.0 part N-(N-phenylaminophenyl)aminophenol and 0.02 part tetramethylphosphonium hydroxide are added, followed by reaction at the same temperature under a nitrogen gas atmosphere. The viscosity becomes nearly constant 10 minutes after the start of the reaction and the dimethylsiloxane cyclic tetramer is then stripped in vacuo at 250° C./10 mmHg. The reaction product is cooled to room temperature, combined with diatomaceous earth and then purified by filtration. The obtained reaction product is a light-yellow, transparent liquid with a viscosity of 15,300 cS.

Ten parts of this reaction product is added to 100 parts of a hydroxyl group-terminated dimethylpolysiloxane with a viscosity of 10,000 cS and this is then mixed at room temperature to homogeneity to afford an organopolysiloxane oil with a viscosity of 10,400 cS.

Thirty grams of this organopolysiloxane oil is weighed into a 100 cc beaker and then maintained in a hot air-circulation oven at a temperature of 250° C. in order to measure the viscosity change.

The results are reported in Table 1.

COMPARISON EXAMPLE 5

As a blank test, thirty grams of the hydroxyl group-terminated dimethylpolysiloxane with a viscosity of 10,000 cs is weighed into a 100 cc beaker and then maintained in a hot air-circulation oven at a temperature of 250° C. in order to measure the viscosity change.

The results are reported in Table 1.

EXAMPLE 6

Ten parts of the reaction product of Example 5 is added to 100 parts of hydroxyl group-terminated dimethylpolysiloxane with a viscosity of 30,000 cS and this is then mixed at room temperature to homogeneity to obtain an organopolysiloxane oil with a viscosity of 28,300 cS.

Thirty grams of this organopolysiloxane oil is weighed into a 100 cc beaker and then maintained in a hot air-circulation oven at a temperature of 250° C. in order to measure the viscosity change.

The results are reported in Table 1.

COMPARISON EXAMPLE 6

To 100 parts of the hydroxyl group-terminated dimethylpolysiloxane with a viscosity of 30,000 cS is added 0.6 part organopolysiloxane with the formula

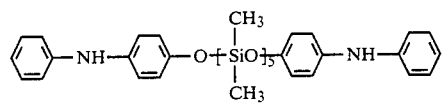

and this is then mixed at room temperature to homogeneity.

Thirty grams of this organopolysiloxane oil is weighed into a 100 cc beaker and then maintained in a hot air-circulation oven at a temperature of 250° C. in order to measure the viscosity change.

The results are reported in Table 1.

TABLE 1

| No. | Initial Viscosity (cS) | After 50 Hours (cS) At 250° C. | After 100 Hours (cS) At 250° C. | After 200 Hours (cS) At 250° C. | Gelation Time (Hours) |
|---|---|---|---|---|---|
| Example | | | | | |
| 1 | 920 | 902 | 884 | 883 | 650 |
| 2 | 350 | 339 | 335 | 332 | 700 |
| 3 | 2000 | 1940 | 1900 | 1880 | 600 |
| 4 | 5500 | 5320 | 5300 | 5290 | 750 |
| 5 | 10400 | 9540 | 9230 | 9380 | 450 |
| 6 | 28300 | 26400 | 25200 | 26300 | 500 |
| Comparison Example | | | | | |
| 1 | 1000 | 1240 | gelation | — | 70 |
| 2 | 1000 | 890 | 813 | 805 | 550 |
| 3 | 2000 | 1810 | 1690 | 1580 | 600 |
| 4 | 5000 | 3910 | 3090 | 2630 | 750 |
| 5 | 10000 | 9930 | gelation | — | 90 |
| 6 | 30000 | 25200 | 23900 | 25900 | 450 |

We claim:

1. A composition comprising the reaction product of: (A) an organopolysiloxane which possesses at least 10 siloxane units and has the average unit formula $$R_a SiO_{(4-a)/2}$$

wherein R is a monovalent hydrocarbon group and a is 1.4 to 2.3 with (B) from 0.01 to 10 parts by weight of an aromatic aminophenol per 100 parts of said organopolysiloxane (A), in the presence of (C) from 0.001 to 1.0 parts by weight of a quaternary phosphonium hydroxide per 100 parts of said organopolysiloxane (A).

2. The composition of claim 1, wherein said organopolysiloxane (A) is selected from straight chain or branched chain diorganopolysiloxanes.

3. The composition of claim 2, wherein said organopolysiloxane (A) is selected from dimethylpolysiloxane homopolymers, copolymers of dimethylsiloxane with phenylmethylsiloxane or copolymers of dimethylsiloxane with diphenylsiloxane.

4. The composition of claim 3, wherein the end groups on said organopolysiloxane (A) are selected from trimethylsiloxy or hydroxyl radicals.

5. The composition of claim 4, wherein said aromatic aminophenol is selected from N-phenylaminophenol, N-(N-phenylaminophenyl)aminophenol or N-naphthylaminophenol.

6. The composition of claim 5, wherein said quaternary phosphonium hydroxide is selected from tetrabutylphosphonium hydroxide, tetramethylphosphonium hydroxide, or methyltriphenylphosphonium hydroxide.

7. The composition of claim 6, wherein said aromatic aminophenol (B) is present in the range of 0.1 to 5 parts by weight and said quaternary phosphonium hydroxide (C) is present in the range of 0.01 to 0.1 parts by weight, each being based on 100 parts of said organopolysiloxane (A).

8. A composition comprising the reaction product of: (A) an organopolysiloxane which possesses at least 10 siloxane units and has the average unit formula $$R_a SiO_{(4-a)/2}$$

wherein R is a monovalent hydrocarbon group and a is 1.4 to 2.3 with (B) from 0.01 to 10 parts by weight of an aromatic aminophenol per 100 parts of said organopolysiloxane (A), in the presence of (C) from 0.001 to 1.0 parts by weight of a quaternary phosphonium hydroxide per 100 parts of said organopolysiloxane (A) and in the presence of (D) from 0 to 20 parts by weight of an organopolysiloxane cyclic having the general formula

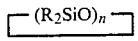

per 100 parts of said organopolysiloxane (A), wherein R is a monovalent hydrocarbon group and n in an integer having a value of 3 to 6.

9. The composition of claim 8, wherein said organopolysiloxane (A) is selected from straight chain or branched chain diorganopolysiloxanes.

10. The composition of claim 9, wherein said organopolysiloxane (A) is selected from dimethylpolysiloxane homopolymers, copolymers of dimethylsiloxane with phenylmethylsiloxane or copolymers of dimethylsiloxane with diphenylsiloxane.

11. The composition of claim 10, wherein the end groups on said organopolysiloxane (A) are selected from trimethylsiloxy or hydroxyl radicals.

12. The composition of claim 11, wherein said aromatic aminophenol is selected from N-phenylaminophenol, N-(N-phenylaminophenyl)aminophenol or N-naphthylaminophenol.

13. The composition of claim 12, wherein said quaternary phosphonium hydroxide is selected from tetrabutylphosphonium hydroxide, tetramethylphosphonium hydroxide, or methyltriphenylphosphonium hydroxide.

14. The composition of claim 13, wherein said aromatic aminophenol (B) is present in the range of 0.1 to 5 parts by weight, said quaternary phosphonium hydroxide (C) is present in the range of 0.01 to 0.1 part by weight and said organopolysiloxane cyclic is present in the range of 0 to 15 parts by weight, each being based on 100 parts of said organopolysiloxane (A).

* * * * *